United States Patent [19]
Feldman et al.

[11] Patent Number: 5,606,434
[45] Date of Patent: Feb. 25, 1997

[54] ACHROMATIC OPTICAL SYSTEM INCLUDING DIFFRACTIVE OPTICAL ELEMENT

[75] Inventors: Michael R. Feldman; Bob T. Kolste; W. Hudson Wlech; Hedong Yang, all of Charlotte, N.C.

[73] Assignee: University of North Carolina, Charlotte, N.C.

[21] Appl. No.: 269,919

[22] Filed: Jun. 30, 1994

[51] Int. Cl.$^6$ ............................. G02B 5/32; G02B 5/18; G03H 1/02; G03H 1/08

[52] U.S. Cl. ................................. 359/3; 359/15; 359/9; 359/569; 359/19

[58] Field of Search ................. 359/15, 16, 19, 359/565, 566, 569, 3–7, 9; 385/37

[56] References Cited

U.S. PATENT DOCUMENTS

| | | |
|---|---|---|
| 3,539,260 | 11/1970 | Burch . |
| 3,712,813 | 1/1973 | Ross et al. ............... 96/27 |
| 3,832,027 | 8/1974 | King . |
| 4,000,949 | 1/1977 | Watkins . |
| 4,447,111 | 5/1984 | Leib . |
| 4,741,588 | 5/1988 | Nicia et al. ............... 385/37 |
| 4,748,614 | 5/1988 | Dammann et al. ........ 385/37 |
| 4,768,853 | 9/1988 | Bhagavatula ............. 385/37 |
| 4,778,262 | 10/1988 | Haines . |
| 4,813,762 | 3/1989 | Leger et al. . |
| 4,832,464 | 5/1989 | Kato et al. ............... 359/19 |
| 4,862,008 | 8/1989 | Oshida et al. ........... 250/548 |
| 4,880,286 | 11/1989 | Ih . |
| 4,895,790 | 1/1990 | Swanson et al. . |
| 4,960,311 | 10/1990 | Moss et al. . |
| 4,969,700 | 11/1990 | Haines . |
| 5,016,953 | 5/1991 | Moss et al. . |
| 5,016,966 | 5/1991 | Bowen et al. . |
| 5,026,131 | 6/1991 | Jannson et al. ............ 385/37 |
| 5,073,007 | 12/1991 | Kedmi et al. . |
| 5,119,214 | 6/1992 | Nishii et al. . |

(List continued on next page.)

FOREIGN PATENT DOCUMENTS

| | | |
|---|---|---|
| 0444215A1 | 9/1991 | European Pat. Off. . |
| 0526750A1 | 2/1993 | European Pat. Off. . |
| 0545524A1 | 6/1993 | European Pat. Off. . |
| 0561302A1 | 9/1993 | European Pat. Off. . |

OTHER PUBLICATIONS

Jahns et al., "Two–Dimensional Array of Diffractive Microlenses Fabricated by Thin Film Deposition", Applied Optics, vol. 29, No. 7, Mar. 1, 1990, pp. 931–936.

(List continued on next page.)

*Primary Examiner*—Jon W. Henry
*Attorney, Agent, or Firm*—Bell, Seltzer, Park & Gibson

[57] ABSTRACT

An aromatic optical system that preferably includes a light source for emitting light therefrom, an achromatic optical element positioned to receive light emitted from the light source, and an optical detector positioned to receive and detect light passing through the optical element. The achromatic optical element preferably includes a substrate having opposing sides, a first computer generated hologram positioned on one side of the substrate and adapted to receive light emitted from the light source, and a second computer generated hologram positionally aligned on the opposite side of the substrate and adapted to receive light passing through the substrate from the first hologram at a predetermined location thereon. A method of forming an achromatic diffractive optical element is also provided which includes the steps of determining a first data set comprising a plurality of discrete phase values and discrete transition values and selecting from the first data set phase values and transition values to form a second data set for defining first and second holograms. A discrete value of the second data set is then replaced by another discrete value from the first data set. A change of an optical system error function is then determined responsive to the replacement in the second data set. If the error function is reduced, the new data set is retained.

5 Claims, 5 Drawing Sheets

U.S. PATENT DOCUMENTS

| | | |
|---|---|---|
| 5,128,780 | 7/1992 | Smith . |
| 5,162,927 | 11/1992 | Moss et al. . |
| 5,194,971 | 3/1993 | Haines . |
| 5,202,775 | 4/1993 | Feldman et al. . |
| 5,216,527 | 6/1993 | Sharnoff et al. . |
| 5,227,915 | 7/1993 | Grossinger et al. . |
| 5,237,433 | 8/1993 | Haines et al. . |
| 5,272,550 | 12/1993 | Dickson et al. . |
| 5,272,690 | 12/1993 | Bargerhuff et al. . |

OTHER PUBLICATIONS

I. Weingartner, "Real and achromatic imaging with two planar holographic optical elements," Opt. Communications 58, No. 6, pp. 385–388 (Jul. 1986).

M. R. Feldman and C. C. Guest, "Iterative Discrete On–axis Encoding for Computer Generated Holograms," OSA Annual Meeting, Technical Digest Series 18, 110 (1989).

M. R. Feldman and C. C. Guest, "Iterative encoding of high–efficiency holograms for generation of spot arrays," Optics Letters 14, No. 10, pp. 479–481 (May 15, 1989).

G. J. Swanson, "Binary Optics Technology: The Theory and Design of Multi–Level Diffractive Optical Elements," MIT: Lincoln Lab Report (Aug. 14, 1989).

M. Kato, S. Maeda, F. Yamagishi, H. Ikeda, and T. Inagaki, "Wavelength independent grating lens system," Applied Optics vol. 28, No. 4, pp. 682–686 (Feb. 15, 1989).

W. H. Welch and M. R. Feldman, "Iterative Discrete On–axis (IDO) Encoding of Diffractive Optical Elements," OSA Annual Meeting, Technical Digest Series 15, 72 (1990).

M. W. Farn and J. W. Goodman, "Diffractive doublets corrected at two wavelengths," J. Opt. Soc. Am. A/vol. 8, No. 6, pp. 860–867 (Jun. 1991).

M. Nakkar, J. D. Stack, W. H. Welch and M. R. Feldman, "Computer generated holograms for large deflection angle optical interconnects," in OSA Annual Meeting Technical Digest, (Optical Society of America), 23, 189 (1992).

M. B. Stern and S. S. Medeiros, "Deep three–dimensional microstructure fabrication for infrared binary optics," J. Vac. Sci. Technol. B 10(6), Nov./Dec. (1992).

W. H. Welch, J. E. Morris, and M. R. Feldman, "Iterative discrete on–axis encoding of radially symmetric computer–generated holograms," Journal of the Optical Society of America—A (Submitted Mar. 25, 1992) (Published vol. 10, No. 8, Aug. 1993).

W. H. Welch, "Design Fabrication and Evaluation of Computer Generated Holograms," Thesis submitted to the faculty of the University of North Carolina at Charlotte (1992).

J. E. Morris, M. R. Feldman, W. H. Welch, M. Nakkar, H. Yang, J. Childers, and Y. Raja of Optical Engineering, UNC–Charlotte and I. Turlik, G. Adema, P. Magill, and E. Yung of MCNC Center for Microelectronics Research Triangle Park, NC, "Prototype Optically Interconnected Multichip Module based on Computer Generated hologram Technology," Optoelectronic Interconnects, SPIE vol. 1849 (1993).

M. B. Stern and T. R. Jay, "Dry etching—Path to coherent refractive microlens arrays," SPIE Proc., 283–292 (1992).

F. Kiamilev, J. Morris, J. Chiders, R. Sharma, V. Badoni, M. Feldman, D. Stevenson, "Optically interconnected MCMs for gigabit ATM switches," SPIE vol. 1849 Optoelectronic Interconnects (1993).

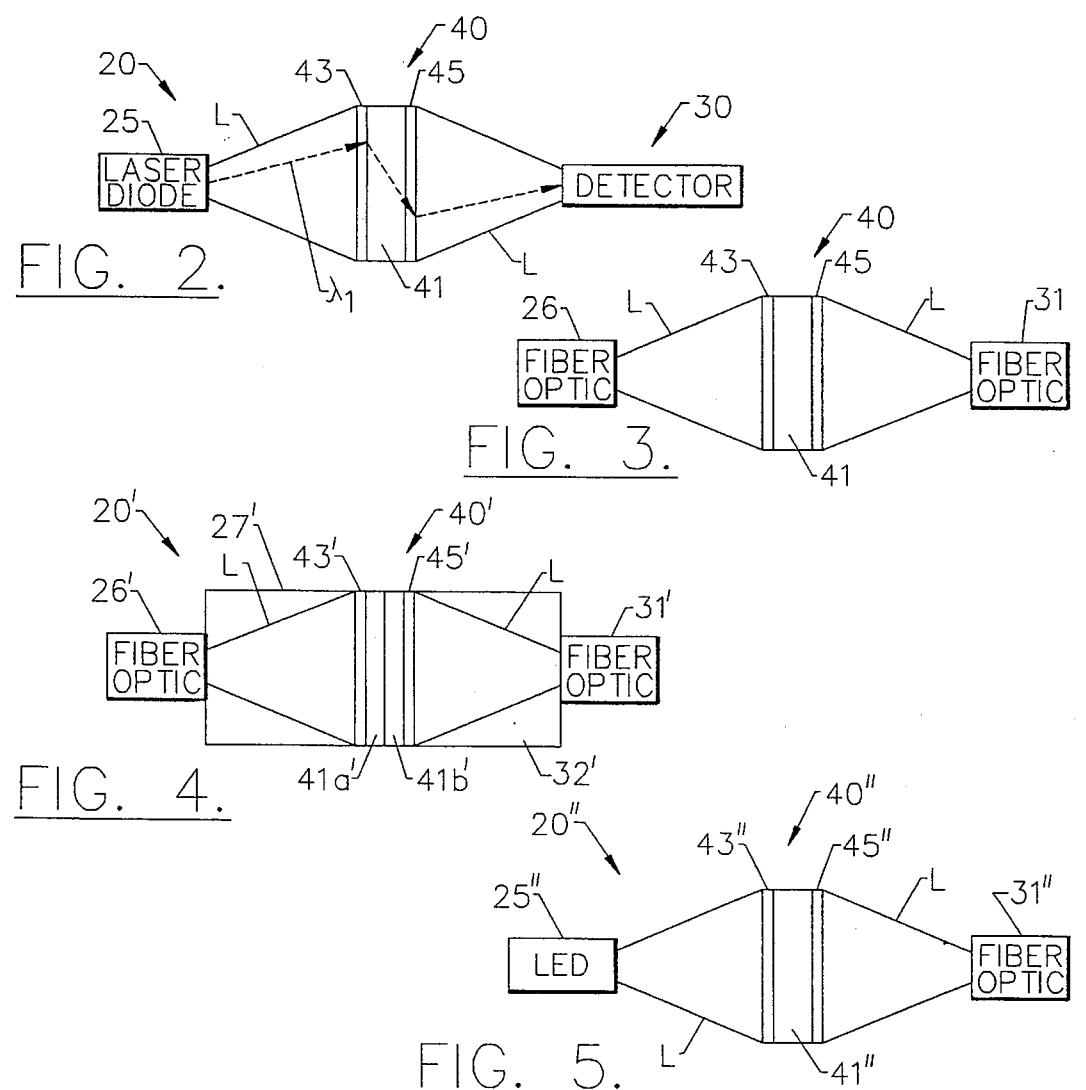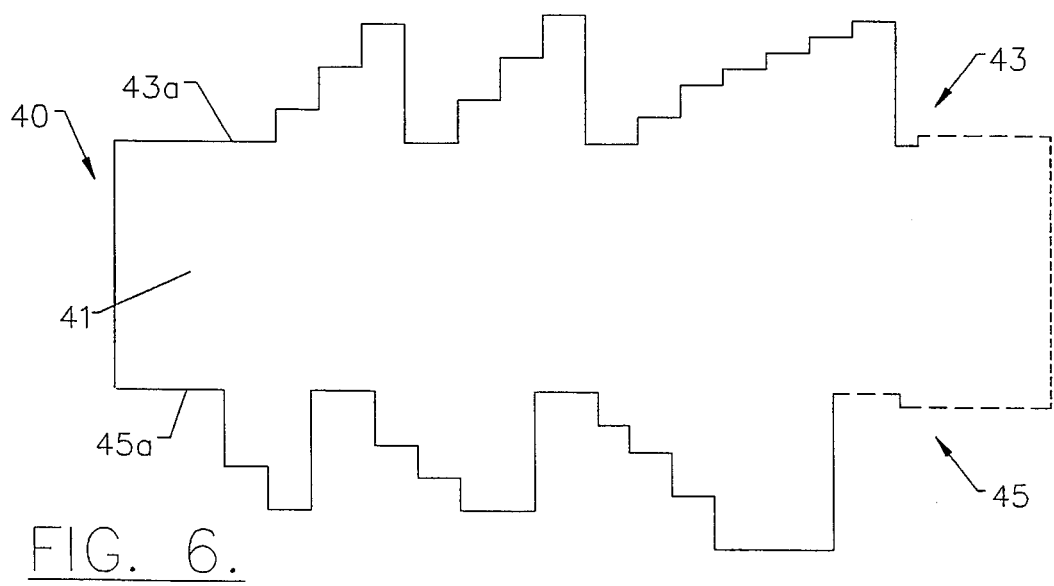

| RAY TRACING METHOD | | DUAL DIFFRACTIVE ACHROMATIC METHOD | |
|---|---|---|---|
| WAVELENGTH | COUPLING EFFICIENCY | WAVELENGTH | COUPLING EFFICIENCY |
| 1250 nm | 74% | 1250 nm | 78% |
| 1300 nm | 68% | 1300 nm | 82% |
| 1350 nm | 51% | 1350 nm | 78% |

FIG. 11.

ACHROMATIC OPTICAL SYSTEM INCLUDING DIFFRACTIVE OPTICAL ELEMENT

FIELD OF THE INVENTION

This invention relates to holography, and more particularly to optical systems and holographic lenses, also referred to as diffractive optical elements, and holographic fabrication methods.

BACKGROUND OF THE INVENTION

Developments in diffractive optics technology have opened the doors for diffractive optical elements ("DOEs") to play major roles in a wide number of optical systems and applications including high resolution imaging systems such as head-mounted displays, focussing and collimating optics for fiber-optic couplers and connectors and other optical interconnect applications, and chromatic aberration correction of refractive optical elements.

One type of diffractive optical element known as a "natural hologram" is fabricated by creating interference among coherent light beams on a photographic plate and then developing the photographic plate. An example of such a hologram may be seen in U.S. Pat. No. 4,607,914 by Fienup titled "Optical System Design Techniques Using Holographic Optical Element." These natural holograms, however, are difficult to mass produce.

In order to overcome the mass production problems with interferometric holograms, computer generated holograms ("CGHs") have been developed. CGHs have been fabricated by calculating the desired holographic pattern to perform a particular function and then forming the pattern on a glass or other substrate using photolithographic or other techniques. This technique is described, for example, in U.S. Pat. No. 4,960,311 by Moss et al. titled "Holographic Exposure System For Computer Generated Holograms."

When natural holograms are used to replace conventional refractive optical elements such as lenses and prisms, they are typically referred to as holographic optical elements ("HOEs"). In order to distinguish HOEs from CGHs when CGHs are used to replace similar refractive elements, they are typically referred to as diffractive optical elements ("DOEs").

While natural holograms are conventionally analog in nature, CGHs on the other hand are conventionally digital in nature. That is the calculation of the CGH is often done by calculating a CGH pattern at discrete locations often referred to as "pixels" and quantizing phase and/or amplitude functions to discrete levels. This is done principally to simplify the fabrication of CGHs. For example, in U.S. Pat. No. 4,895,790 by Swanson et al. titled "High-Efficiency, Multi-level, Diffractive Optical Elements," a method is described for fabricating CGHs containing $2^N$ phase levels, where N is the number of masks and etching steps employed.

DOEs, however, can also be fabricated by a continuous method, for example by diamond turning the calculated pattern onto a glass substrate. DOEs fabricated in this manner are often termed continuous DOEs, while DOEs fabricated with discrete steps are typically termed, "binary optics," "multilevel DOEs", or "digital optics."

A well known problem associated with DOEs is a large amount of chromatic aberrations. For example, while a single DOE can be designed to yield diffraction limited performance for imaging or focussing a single wavelength, the DOE exhibits severe chromatic aberrations, much larger than that of a comparable refractive imaging/focusing lens, when wavelengths other than the design wavelength are employed.

This is especially important when a broadband light source, such as an LED, is used (e.g., for imaging, collimating, or focussing) with a DOE. It is also important, however, when a very narrow band light source such as a laser diode is employed. This is because the lasing wavelength of laser diodes typically has a very high sensitivity to temperature, e.g., 0.30–0.5 nanometers per degree centigrade (°C.). In addition, many fiber-optic connectors are designed to operate with several different types of laser diodes, each having a different wavelength.

While it is known that a refractive optical element can be combined with a DOE to perform achromatic imaging, it is much more difficult to achieve achromatic imaging with solely diffractive elements. Due to their low cost, it is often desirable to manufacture DOEs with solely diffractive surfaces, especially in large volumes.

It is also known that two DOEs can be analytically designed or designed with computer ray tracing procedures so that they function together to reduce chromatic aberrations. For example, in a publication titled *"Wavelength Independent Grating Lens System,"* Applied Optics, Vol. 28, No. 4, pp. 682–686, 1989, by Kato et al., a method was described having two distinct DOEs in a complimentary manner so that two different wavelengths could be brought to a common focal point. A ray tracing procedure is described in which two holograms are used to image a point on-axis. The spatial frequency at each point along the radius (r) of each DOE is calculated so that rays for two different wavelengths are brought to a common focus. The DOE is then fabricated with a grating period that varies as a function of r. The period of the grating as a function of r is determined by the spatial frequencies calculated during the ray tracing procedure.

This particular technique, however, has several drawbacks. First, the diffraction efficiency of this technique is severely limited. The gratings employed are binary gratings. Binary phase gratings have an efficiency of about 40% for a combined efficiency of about 16% for transmission through both DOEs.

The number of levels that can be employed with such a technique is limited by the minimum feature size of such processes. The maximum number of phase levels (N) that can be employed in such a process is given by:

$$N \leq T/\delta \qquad (1)$$

where delta ($\delta$) is the minimum feature size. The diffraction efficiency ($\eta$) in the +1 order of a grating with N phase levels is given by Equation (2) set forth below:

$$\eta = \left[ \frac{N \sin\left(\frac{\pi}{N}\right)}{\pi} \right]^2 \qquad (2)$$

If the grating period needed is 2 micrometers (μm) and the minimum feature size is 0.5 μm, then the maximum number of phase levels that can be employed is 4, yielding an efficiency of each DOE of about 80% and combined efficiency of about 64%. Note that this limitation stems from a design procedure that considers only a single diffraction order emanating from each grating (the +1 order), when in actuality, for a multilevel DOE, multiple orders are actually generated.

This limitation is a drawback of ray tracing and continuous analytic techniques. That is, the DOE surfaces are modelled as continuous functions or continuous blazed gratings. Such continuous functions/gratings generate only a +1 order with 100% efficiency (in theory). In practice, a multilevel DOE is not continuous. The discrete steps are responsible for generating multiple diffraction orders, lowering the efficiency in the +1 diffraction order.

A second drawback of this approach is that the two optical elements must be placed relatively far apart to minimize the spatial frequencies contained in the elements. The maximum deflection angle that can be realized with reasonable diffraction efficiency with state-of-the-art fabrication techniques is approximately 25 degrees (°). Assuming a source divergence half angle of 15° and equal sized elements, this limits the distance (D) of separation between the two DOEs to greater than about three times the diameter (d) of each of the elements. In many cases, it is desirable to place the elements closer together to improve alignability or reduce the overall system volume.

A third drawback is that this approach is not a diffraction based approach, but instead a geometrical optics based approach. Thus, while it can be used to minimize or eliminate geometrical aberrations, it will not in most cases achieve diffraction limited performance. That is the optimization procedure will result in perfect geometrical optics performance for two different wavelengths, but no diffraction effects are accounted for in this procedure. Thus, the tailoring of the side lobes of the DOE and other diffraction based effects cannot be performed with this procedure. Thus, for example, it could not be used directly to optimize the coupling efficiency for a laser-to-fiber coupler or to create a flat-top profile.

Fourth, this method is limited to radially symmetric DOEs. This is a drawback for use with many commercial diode lasers that contain different divergence angles in the two orthogonal directions. For such asymmetrical cases, it is often desirable to have non-radially symmetric anamorphic lenses.

Finally, with this method, the resulting DOEs are generally not identical to each other. In some cases, as in separable fiber-optic couplers, it is desirable to have the two DOEs identical so that the parts can be interchangeable as with conventional fiber-optic separable connectors.

Another method that is known for designing DOEs is iterative encoding methods such as iterative discrete on-axis ("IDO") encoding described in the publication titled *"Iterative Encoding Of High-Efficiency Holograms For Generation Of Spot Arrays,"* Optical Society of America, pp. 479–81, 1989, by co-inventor Feldman et al., and radially symmetric iterative discrete on-axis ("RSIDO") encoding described in U.S. Pat. No. 5,202,775 titled "Radially Symmetric Hologram And Method Of Fabricating The Same" also by co-inventor Feldman et al.

In the IDO encoding method, the DOE is divided into a two-dimensional array of rectangular cells. An initial transmittance value for each rectangular cell is chosen. An iterative optimization process, such as simulated annealing, is then used to optimize the transmittance values of the cells. This is achieved by choosing an error function for the hologram that is a measure of the image quality. A single cell is changed, and the change in the output pattern is computed. The error function is then recalculated. Based upon the change in the error function, the change is either accepted or rejected. The process is iteratively repeated until an acceptable value of the error function is reached which optimizes the image quality. Computers are often used for performing these iterations because of the immense time involved in the optical system calculations.

The RSIDO encoding method is another iterative method, except that the cells are radial rings rather than rectangular and not only are the phase values of each cell optimized, but also the transition points. Although this method has been shown to be successful for various applications, the amount of chromatic compensation that can be achieved with this method, however, may be limited.

Another known method for designing DOEs for achromatic operation, such as described in the publications titled *"Deep Three-dimensional Microstructure Fabrication For IR Binary Optics,"* J. Vac. Sci. Technol. B10, pp. 2520–2525, 1992 by Stern et al. and titled *"Dry Etching: Path To Coherent Refractive Microlens Arrays,"* SPIE Proc., pp. 283–292, 1992, is to create deep multilevel DOEs that have phase depths that are larger than conventional multilevel DOEs. In conventional digital optics, the phase depth ($d_m$) of each level is given by $$d_m = \frac{\lambda \cdot M}{N(n-1)} \quad (3)$$

where n is the index of refraction and m=0, 1, . . . N−1 and $\lambda$ is the central wavelength. This will result in a phase difference between the m=0 level and any other level of $2\pi$ m/N.

In a deep multilevel DOE, on the other hand, the phase difference is set equal to an integer number multiple of $2\pi$ (m/N) (e.g., $4\pi$ m/N or $6\pi$ m/N). It is known that $d_m$ can be set equal to any integer multiple of $2\pi$ and the DOE will not function any differently. Within predetermined paraxial approximations at the design wavelength, however, the chromatic aberrations about this wavelength will improve.

A problem with this approach is that the diffraction efficiency is less than that of the conventional DOE approach. Instead of Equation 2, the diffraction efficiency for the deep multilevel approach is:

$$\eta = \left[ \frac{(N/p)\sin(p\pi/N)}{\pi} \right]^2 \quad (4)$$

where p is the integer multiple of $2\pi$ employed. Thus, for example if the phase difference were set to $8\pi$m/N, p would have a value of 4, and for an 8 phase level structure, the diffraction efficiency of a deep multilevel DOE would be only 40% as compared to 95% for an 8 phase level conventional multilevel DOE.

In practice, the above approaches have resulted in reasonable efficiency DOEs with only a small amount of chromatic aberration for practical applications. For example, for laser diode-to-fiber couplers, a coupling efficiency of greater than 70% was achievable with a single wavelength. Over an operating temperature range of −40° to +85° C., however, less than about 5% may be achieved with a single DOE designed with commercial ray tracing programs. By using a single element RSIDO encoded hologram, the coupling efficiency was improved to about 15%–17% over the operating temperature range. The other methods described above may not be practical for this application due to one or more of the following reasons: low efficiency, high cost, or large volume.

Thus, there is a continued need for achromatic optical systems and achromatic DOEs with high diffraction efficiency for various practical commercial applications.

SUMMARY OF THE INVENTION

It is therefore an object of the present invention to provide an optical system and a diffractive optical element ("DOE")

that have high diffraction efficiency over a wide spectral range.

It is also an object of the present invention to provide a method of fabricating a hologram that is practical in terms of cost and size, such as for laser diode and LED applications and for head-mounted display applications.

These and other objects are provided, according to the present invention, by an achromatic optical system having a light source for emitting light therefrom, an achromatic diffractive optical element positioned to receive light emitted from the light source, and an optical detector positioned to receive and detect light passing through the optical element. The achromatic optical element preferably includes a substrate having opposing sides, a first hologram positioned on one side of the substrate and adapted to receive light emitted from the light source, and a second hologram positioned on the opposite side of the substrate and adapted to receive light passing through the substrate from the first hologram at a predetermined location thereon.

The first hologram is preferably a computer generated hologram positioned on one side of the substrate and preferably has a first multilevel diffractive surface. The first computer generated hologram is adapted to receive light emitted from the light source and pass the received light through the first multilevel diffractive surface. The second hologram is also preferably a computer generated hologram positionally aligned on the opposite side of the substrate and also preferably has a second multilevel diffractive surface. The second computer generated hologram is adapted to receive light passing through the substrate from the first hologram at a predetermined location on the second multilevel surface.

An achromatic diffractive optical element according to the present invention advantageously provides only diffractive surfaces with achromatic performance over a wide wavelength range. The achromatic diffractive optical element also has significantly higher diffraction efficiency than could be achieved with previous methods.

The present invention also includes methods of forming and designing an achromatic diffractive optical element. These methods preferably have the steps of determining a first data set comprising a plurality of discrete phase values and discrete transition values. From the first data set, phase values and transition values are selected to form a second data set for defining the first and second holograms. A discrete value of the second data set is preferably replaced by another discrete value from the first data set, and a change of an optical system error function is determined responsive to the replacement in the second data set. The new data set is then retained if the error function is reduced. The steps of replacing a discrete value of the second data set, determining a change of an optical system error function, and retaining the new data set if the error function is reduced is repeated until at least one of the values has been replaced at least one time to thereby optimize the discrete phase values and the discrete transition values. The first hologram and the second hologram are then fabricated from the optimized discrete phase values and discrete transition values onto respective opposing sides of a substrate using techniques such as deposition and lift-off.

The methods of designing and fabricating an achromatic diffractive optical element according to the present invention differ from previous dual element diffractive achromatic structures in at least two major respects. First, with these methods, the diffractive surfaces are modelled as discrete surfaces with quantized phase values. Second, diffraction theory, instead of ray tracing, is used to determine the complex amplitude distribution in the output plane in order to calculate the error function on each iteration. Thus, unlike previous achromatic DOE design approaches, the achromatic diffractive optical element according to the present invention can be designed to optimize for diffraction effects. Therefore, the efficiency of the achromatic diffractive optical element is not limited to the product of the efficiencies of the individual hologram surfaces given by Equations (2) and (4) set forth above. Since wave diffraction is used in the design rather than ray tracing, the achromatic diffractive optical element can be optimized to take advantage of multiple diffraction orders of the two hologram surfaces. Equations (2) and (4) above, for example, give the power in the +1 order only.

Furthermore, by use of appropriate cell or fringe sizes, restrictions on maximum spatial frequencies in the holograms are automatically included thereby allowing the holograms to be placed closer together than with previous ray tracing methods. Diffraction efficiency is also improved with the use of an iterative procedure such as the IDO or RSIDO encoding methods. Additionally, a restriction that the two holograms have the same transmittance function can also be included, and the two elements do not need to be radially symmetric.

With these diffractive optical element design methods, since discrete level iterative encoding methods are employed, "phase skipping" may also occur. Phase skipping means that the phase difference between some of the fringes is greater than 1 phase level, but less than N−1 levels. Phase skipping provides an advantage in that the optical element can be designed and fabricated to achieve improved diffraction efficiency.

BRIEF DESCRIPTION OF DRAWINGS

Some of the objects and advantages of the present invention having been stated, others will become apparent as the description proceeds when taken in conjunction with the accompanying drawings in which:

FIG. 2 is a schematic view of an achromatic optical system according to a first embodiment of the resent invention;

FIG. 3 is a schematic view of an achromatic optical system according to a first embodiment of the present invention and further illustrating fiber optic lines in the system;

FIG. 4 is a schematic view of an achromatic optical system according to a second embodiment of the present invention;

FIG. 5 is a schematic view of an achromatic optical system according to a third embodiment of the present invention;

FIG. 6 is an enlarged schematic view of an achromatic diffractive optical element according to the present invention;

FIG. 11 is a table comparing the diffraction efficiencies of diffractive optical elements designed by a ray tracing method versus diffractive optical elements designed by a method according to the present invention.

DETAILED DESCRIPTION OF A PREFERRED EMBODIMENT

The present invention now will be described more fully hereinafter with reference to the accompanying drawings in which preferred embodiments of the invention are shown. This invention may, however, be embodied in many different forms and should not be construed as limited to the illustrated embodiments set forth herein; rather, the embodiments are provided so that this disclosure will be thorough and complete and will fully convey the scope of the invention to those skilled in the art. For clarity, the thickness of layers have been exaggerated. Like numbers refer to like elements throughout.

Figure 1:
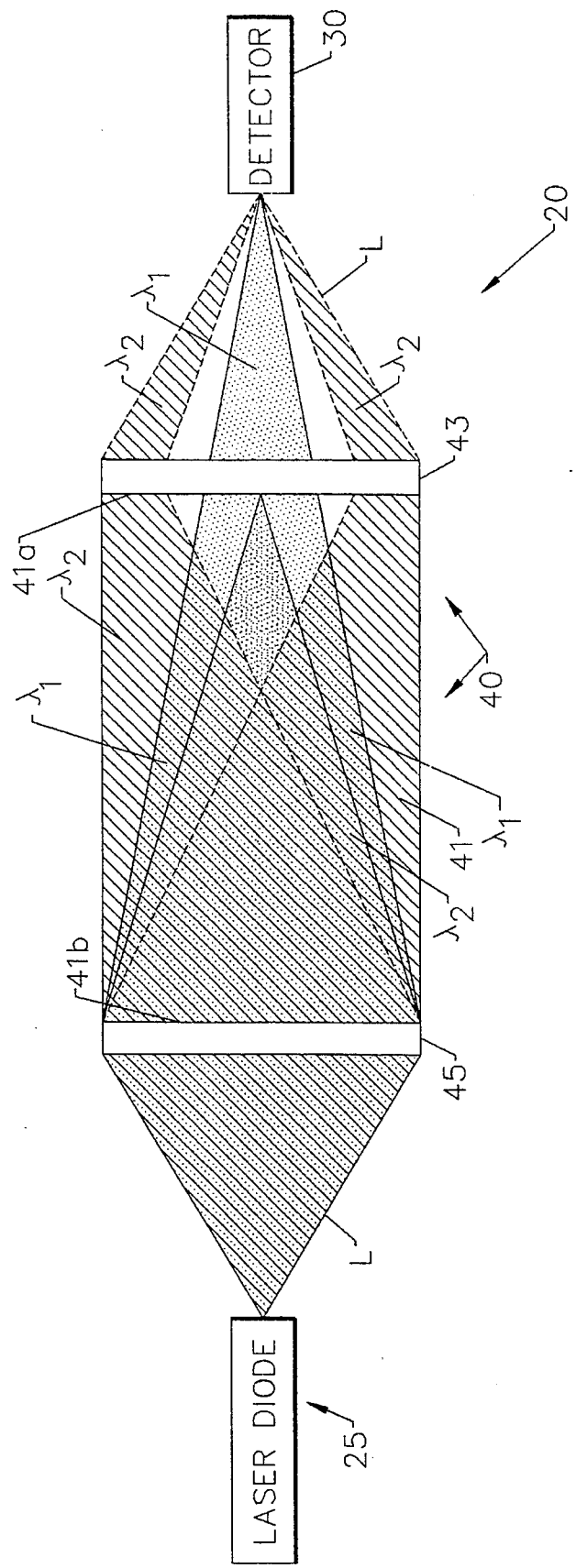
FIG. 1 is a schematic view of an achromatic optical system according to the present invention illustrating at least first and second wavelengths of light being transmitted through an achromatic diffractive optical element.

FIG. 1 is a schematic view of an achromatic optical system 20 according to the present invention. The optical system 20 preferably has a light source 25, shown in the form of a laser diode, for emitting light L therefrom, an achromatic diffractive optical element 40 positioned to receive light L emitted from the light source 25, and an optical detector 30 positioned to receive and detect light L passing through the optical element 40. The achromatic diffractive optical element 40 preferably includes a substrate 41 having opposing sides 41a, 41b, a first hologram 43, preferably a computer generated hologram ("CGH"), positioned on one side 41a of the substrate 41 and adapted to receive light L emitted from the light source 25, and a second hologram 45, preferably a CGH, positioned on the opposite side 41b of the substrate 41 and positionally aligned with the first hologram 43. The second hologram 45 is adapted to receive light L which passes through the substrate 41 from the first hologram 43 at a predetermined location thereon.

FIG. 1 further illustrates a first wavelength $\lambda_1$ of light L from the light source 25 being transmitted through the achromatic diffractive optical element 40 with a first shading pattern and a second wavelength $\lambda_2$ from the light source 25 being transmitted through the achromatic diffractive optical element 40 with a second shading pattern. This view illustrates that different wavelengths illuminate different portions of the second hologram 45 so that different functions in the second hologram 45 may be advantageously used in these different portions. Regions of overlap of the wavelengths are illustrated with a third shading pattern, and regions where neither wavelength is present are shown with no shading pattern.

In some applications of the optical system 20, such as wavelength division multiplexing ("WDM"), multiple lasers or laser diodes may be employed, each with a narrow spectral width of light emission and large spacing between the bands, e.g., 1560.6, 1557.5, 1554.2, 1551, and 1480 nanometer (nm) with each one ±0.5 nm, to thereby form a series of bands. A WDM multiplexer coupler then receives light from each laser and couples all of the light from the lasers into a single fiber optic. A WDM demultiplexer then receives the light from the fiber optic and transfers each wavelength into a different fiber or different detector. This optical system 20 illustrates that the diffractive optical element 45 of the present invention may be designed for such discrete bands of wavelengths.

FIGS. 2–5 schematically illustrate other embodiments of an achromatic optical system 20, 20' according to the present invention. For clarity, like elements in these embodiments are referred to by prime (') or double-prime (") notation. FIG. 2 is a schematic view of an achromatic optical system 20 according to a first embodiment of the present invention similar to that shown in FIG. 1. The broken lines and arrows shown from the light source 25, through the diffractive optical element 45, and to the detector 30 illustrate the travel of wavelengths of light L. FIG. 3 is a schematic view of an achromatic optical system 20 according to a first embodiment of the present invention, but also having a pair of elongate fiber optic lines, cables, or strands 26, 31 which are preferably respectively connected to the light source 25 and the detector 30.

FIG. 4 is a schematic view of an achromatic optical system 20' according to a second embodiment of the present invention. This embodiment of the optical system 20' illustrates a pair of fiber optic couplers 27', 32' connected to each respective fiber optic line 26', 31'. Each coupler 27', 32' has a respective hologram 43', 45' which is positioned on a separate substrate 41a', 41b' within the coupler 27', 32'. The couplers 27', 32' preferably are coaxially positioned and align when joined so as to form a diffractive optical element 40' according to the present invention.

FIG. 5 is a schematic view of an achromatic optical system 20" according to a third embodiment of the present invention. This embodiment illustrates a large spectral width light source 25", such as a light emitting diode ("LED"), positioned within the optical system 20". The light L emitted from the LED 25" passes through an achromatic optical element 40", to a fiber optic line 31", and then preferably to a detector 30 such as illustrated in other embodiments.

FIGS. 6–9 schematically illustrate achromatic diffractive optical elements according to various embodiments of the present invention. An achromatic diffractive optical element according to the present invention may also be called a dual diffractive achromatic ("DDA") optical element. FIG. 6 is an enlarged schematic view of an achromatic diffractive optical element 40 according to the present invention. This view illustrates the respective multilevel surfaces 43a, 45a of each of the first hologram 43 and the second hologram 45, as well as the positioning of the holograms 43, 45 on a substrate 41.

Figure 7:
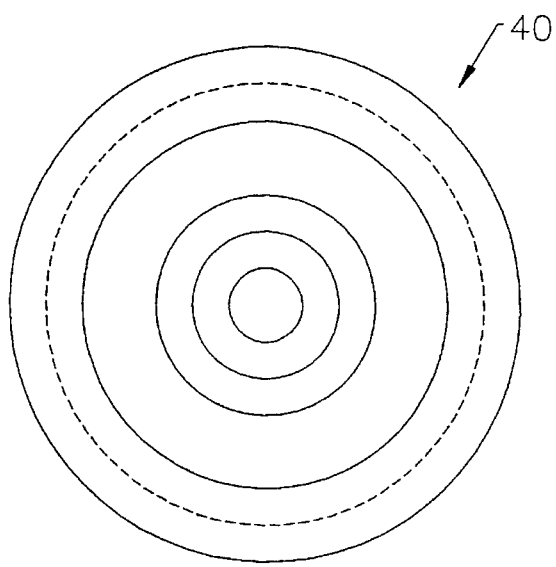
FIG. 7 is an enlarged schematic view of portions of a hologram of an achromatic diffractive optical element according to a first embodiment of the present invention.

FIG. 7 schematically illustrates a hologram 43, 45 of an achromatic diffractive optical element 40 according to a first embodiment of the present invention and designed by a radially symmetric iterative discrete on-axis ("RSIDO") encoding method. The RSIDO encoding method is further described in U.S. Pat. No. 5,202,775 by co-inventor Feldman titled "Radially Symmetric Hologram And Method Of Fabricating The Same" which is hereby incorporated herein in its entirety by reference.

Figure 8A:
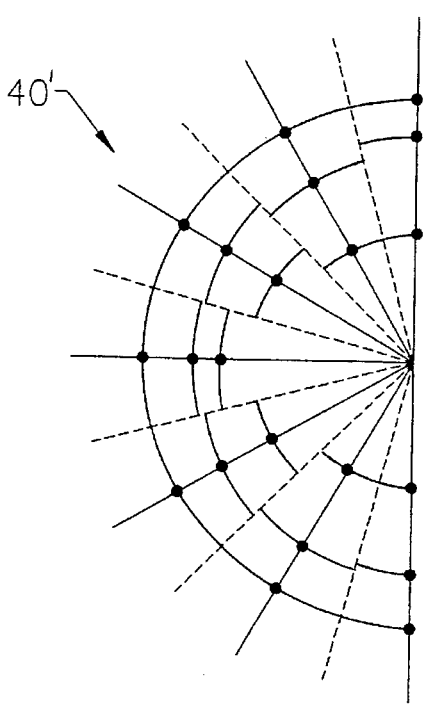
FIG. 8A is an enlarged schematic view of portions of a hologram of an achromatic diffractive optical element according to a second embodiment of the present invention.
Figure 8B:
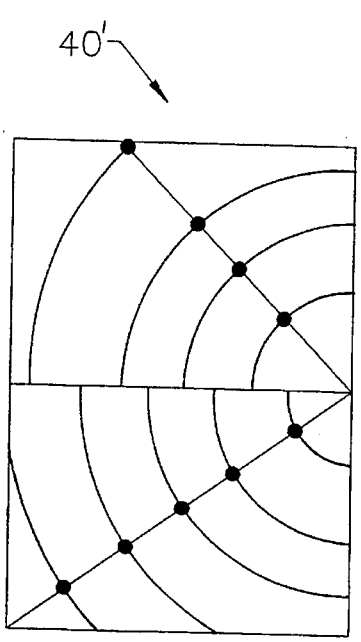
FIG. 8B is an enlarged schematic view of portions of a hologram of an achromatic diffractive optical element according to a second embodiment of the present invention.

FIGS. 8A and 8B are enlarged schematic views of portions of a hologram 43', 45' of an achromatic diffractive optical element 40' according to a second embodiment of the present invention. These holograms 43', 45' preferably are designed by a method called segmented radial portions ("SRP"), The hologram 43', 45' is segmented into regions, i.e., two regions illustrated in FIG. 8B. Within each region, a RSIDO encoding method is utilized so that fringes are portions of circles or arcs. The transition values or points, e.g., each radius, are located so as to minimize an error function for many values of theta (θ), which is a coordinate in a hologram plane. This same method may also be used to approximate elliptically shaped fringes. In addition, instead of using radial fringes as a model for each holographic surface, rectangular pixels may also be used for methods of designing and fabricating an achromatic diffractive optical element according to the present invention.

Figure 9:
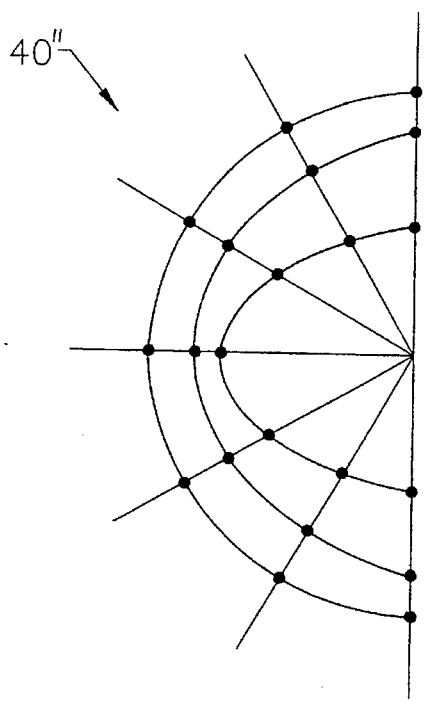
FIG. 9 is an enlarged schematic view of a hologram of an achromatic diffractive optical element according to a second embodiment of the present invention.

FIG. 9 schematically illustrates a hologram 43", 45" of an achromatic diffractive optical element 40" according to a third embodiment of the present invention. This embodiment preferably is designed by a method called generalized RSIDO. This method of designing a hologram uses the RSIDO method, but instead of finding one radius (r) per fringe, several radii for each fringe are located. Each radius located has a different value of θ. Interpolation is then performed with a smooth curve or a segmented polygon to form a contour that connects all of the radii.

Figure 10:
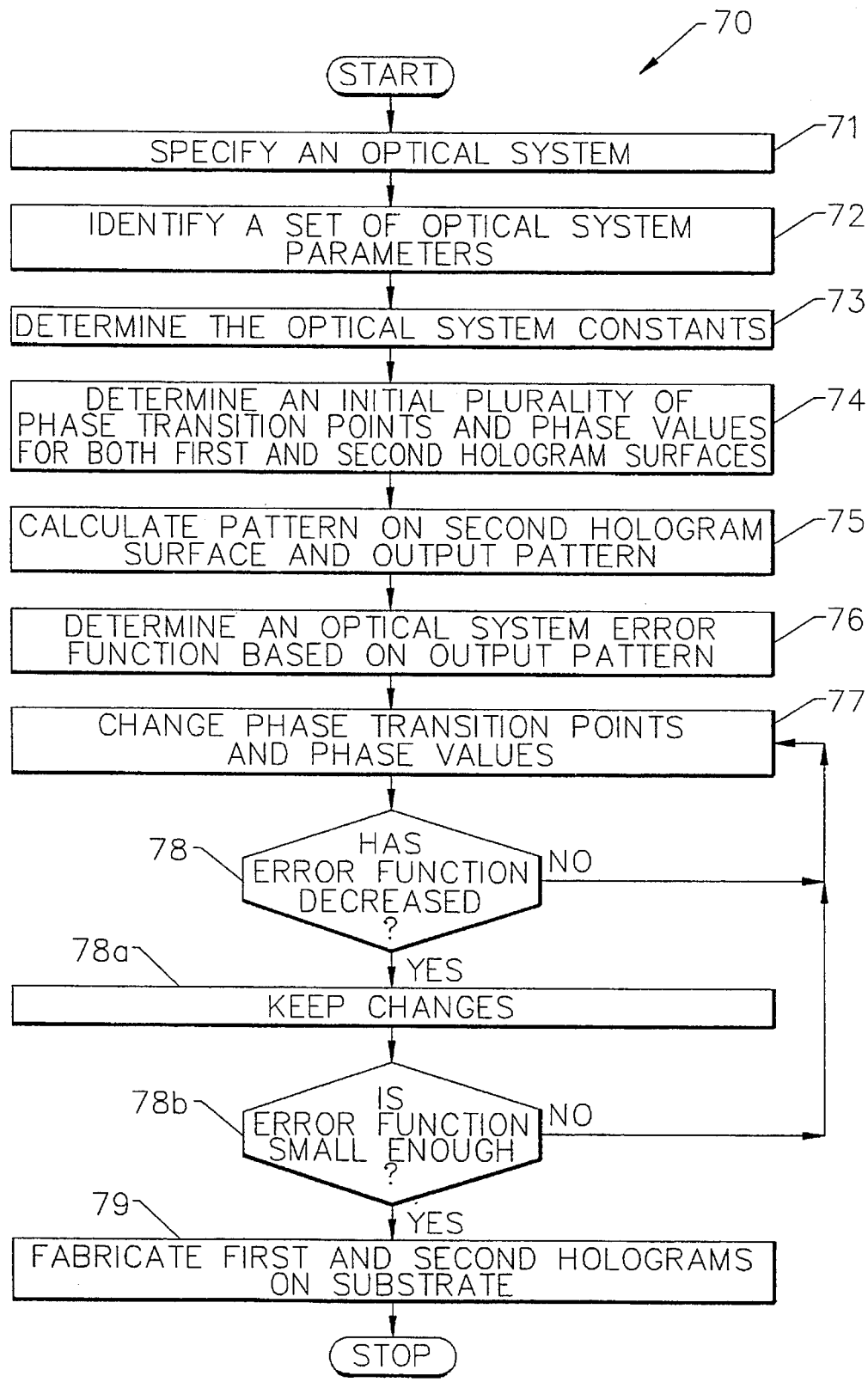
FIG. 10 is a block diagram that illustrates a method of designing and fabricating an achromatic diffractive optical element according the present invention.

FIG. 10 is a block diagram 70 that illustrates a method of designing and fabricating an achromatic diffractive optical element 40 according to the present invention. As shown in block 71 a desired optical system is first specified. In this step, the designer determines the performance characteristics for the optical system 20. These performance characteristics may vary depending on the application. For example, the designer may want to use the achromatic diffractive optical element for a head-mounted display. If this is the desired application, then the designer specifies the desired optical system performance to achieve the desired results as will be understood by those skilled in the art.

Afterwards, as shown in block 72, the optical system parameters are identified. For example, once the desired optical system has been specified, the designer may identify a set of optical parameters for the given system by performing geometric, radiometric, or scalar diffractive calculations well known to those skilled in the art. These optical system parameters may include the curvature of a hologram, the refractive index of a hologram, location and size of a hologram, an image point, focal length, the size of an image, relative spacing between optical elements if more than one is included in the system, the wavelength of the light source 25, as well as other parameters understood by those skilled in the art.

The next step, as shown in block 73, is to determine the optical system constants. The optical system constants, well known to those skilled in the art, may be determined by utilizing the identified set of optical system parameters. For example, an f-number of a hologram is normally determined by the focal length of the hologram divided by the diameter of that hologram. Both the element focal length and element diameter are initial optical system parameters identified in block 72. Once the f-number is calculated, it will remain the same or constant throughout various changes to improve the imaging performance of the specified optical system.

As shown in block 74, a plurality of phase transition values or points and phase values between the transition points are determined for each fringe of the first and second holograms based on the identified set of optical system parameters in block 72 and the optical system constants in block 73. The transition points are preferably radial phase transition points, and the phase values are likewise preferably radial phase values for each fringe. In order to determine the initial plurality of radial phase transition points and radial phase values, two methods may be employed. The first is to randomly choose the values. The second method is to use conventional ray tracing or analytic methods, such as described in the publication titled *"Wavelength Independent Grating Lens System,"* Applied Optics, Vol. 28, No. 4, pp. 682–686, 1989, by Kato et al. which is hereby incorporated herein by reference in its entirety, to determine the initial values. A transmittance function for each of the two different hologram surfaces are determined by dividing each surface into a set of pixels. The pixels may be rectangular cells or circular or elliptically shaped fringes as described above with reference to FIGS. 7–9.

Next, as shown in block 75, the diffraction pattern on the second hologram surface is calculated preferably with the Rayleigh-Sommerfeld diffraction formula. The scalar amplitude and phase distribution on the second hologram surface is given by, $$A(P_1) = \frac{1}{j\lambda} \iint U(P_2) \frac{\exp(j\kappa r_{01})}{r_{01}} \cos(\hat{n}, \overline{r_{01}}) ds \quad (5)$$

where $U(P_2)$ is the scalar amplitude and phase distribution in the plane of the first surface of the first hologram and the integrals are evaluated over the entire first hologram surface plane (ds). The scalar amplitude and phase distribution are found by multiplying the incident wave $A(r21)$ by the first transmittance function, $H(P2)$, of the first hologram surface.

$$U(P_2) = H(P_2) A(r_{21}) \quad (6)$$

The diffraction pattern in the output plane is also calculated preferably by applying the Rayleigh-Sommerfeld diffraction formula again to obtain:

$$U(P_0) = \frac{1}{j\lambda} \iint U(P_1) \frac{\exp(j\kappa r_{01})}{r_{01}} \cos(\hat{n}, \overline{r_{01}}) ds \quad (7)$$

where $U(P1)$ is the scalar amplitude and phase distribution on the exit side of the second hologram surface. The scalar amplitude and phase distribution $U(P1)$ are given by:

$$U(P_1) = H_2(P_1) A(P_1) \quad (8)$$

In this manner the output pattern of the achromatic diffractive optical element 40, U(P0), is computed.

This equation may also be digitized and then used to compute the percentage of power located within a given area which represents the power incident on a detector or coupled into a fiber. This can then be used as the basis for determining an error function as shown in block 76.

Other performance characteristics may also be used related to a measure of image quality for the error function. The phase transmittance of the cells and the transition location of the fringes are preferably determined by iterative optimization. As shown in blocks 77, 78, 78a, and 78b, the transmittance function of both hologram surfaces is changed on each iteration and thereby optimized.

For example, a single cell may be changed on the first hologram surface, and the diffraction pattern on the second hologram surface is updated. Then the change in the output pattern is determined. The error function is then recalculated. Based upon the change in the error function, the change is either accepted or rejected. The process is iteratively repeated until an acceptable value of the error function is reached which optimizes the image quality.

In addition, the structure of the DDA element is different than diffractive elements generated with continuous or ray tracing approaches. With continuous, ray tracing approaches, when the element is actually fabricated, it is often fabricated as a multilevel DOE. In order to generate a multilevel DOE with this method and still have the design valid (i.e., Equation (2) for the efficiency), another method, such as described in U.S. Pat. No. 4,895,790 by Swanson et al. must be applied. In this method a particular number of phase levels, N, is chosen based on the minimum feature size (δ) and smallest grating period according to the Equation set forth below.

$$N_{max} \leq \frac{T_{min}}{\delta} \quad (9)$$

The phase levels are evenly divided according to equation (3). The number of phase levels between any two adjacent fringes (regions of constant phase) is equal to one (1), except between fringes where the difference is equal to the number of phase levels minus one (N−1).

As shown in block 79 of FIG. 10, once the final radial phase values and radial phase transition values are obtained, the DDA optical element can be fabricated with multiple masks and etching or deposition steps. Alternatively, it can also be fabricated by direct write with a laser or electron-beam.

An etch depth can be chosen according to Equation (3) as in conventional multilevel hologram surfaces, or by an integer multiple of $d_m$ given in Equation (3) for deep multilevel DOEs. The use of deep multilevel hologram surfaces in DDA optical element configuration would provide additional achromatic advantages. These deep multilevel DDA optical elements may be fabricated with or without phase skipping. Although glass and quartz, due to their transparent nature, are the most common materials for fabrication of diffractive optical elements, silicon wafers can be used for wavelengths longer than about 1.0 μm. For wavelengths less than about 1.0 μm, though, the absorptive properties of silicon are usually too large for usefulness.

Hydrogenated amorphous silicon, however, can be used to change the absorption edge of silicon, thereby reducing the percentage of light absorbed by the silicon by up to several orders of magnitude in the wavelength range between about 0.73 μm and about 1.0 μm. Even lower wavelengths may be achieved by sputtering alloys of amorphous silicon or polysilicon such as Si—Ge or Si—O2. Hydrogenated amorphous silicon can be deposited by sputtering or by glow discharge chemical vapor deposition. A hologram surface can be fabricated by a deposition/lift-off technique, or by depositing a thin film of amorphous silicon and etching the film with a conventional chemical or dry etching technique.

Since substrates of such materials are not available in wafer form, a conventional transparent diffractive optical element substrate, such as quartz or a type of glass, may be employed. These substrates have a lower refractive index, i.e., about 1.4 to 1.5, and thus would require an intermediate layer to act as an anti-reflection coating between the glass substrate and the silicon film.

Further, according to the present invention,. a method of aligning two or more holograms is also provided. In the preferred embodiment, the two holograms are fabricated on opposite sides of a single substrate. The first hologram is fabricated on one side of the substrate, and in the conventional manner, each layer of the hologram is aligned to a single set of alignment marks. In addition, however, as this first hologram is fabricated, a third hologram is also formed with the sole purpose of facilitating alignment with the second hologram. This third "alignment hologram" is designed to form an alignment pattern on the second side of the substrate when illuminated by a laser beam at normal incidence.

After forming the first hologram on the first side of the substrate, the second side of the substrate is coated with photoresist. A laser is then used to illuminate the "alignment hologram" on the first side of the substrate and to expose the photoresist on the second side of the substrate. After photoresist development, an alignment mark is formed on the second side of the substrate that is well-aligned to the first side of the substrate, e.g., within about 0.5 μm.

FIG. 11 is a table comparing the diffraction efficiencies of samples of diffractive optical elements designed by a ray tracing method versus samples of achromatic diffractive optical elements designed by the method of the present invention. The diffractive optical elements are used to couple light from one fiber optic line to another fiber optic line, such as illustrated in embodiments of the optical systems of FIGS. 8 and 9. The goal in these examples was to couple light over a 100 nm bandwidth, i.e., 1250 nm to 1350 nm. The diameter of each hologram of the optical element was about 125 μm and the spacing between elements was about 1.0 mm.

The data from the table shows the unexpected results achieved by the method of designing an achromatic diffractive optical element according to the present invention wherein the resulting diffractive optical element has a significant improvement in diffraction efficiency, as well as other performance characteristics, in comparison to other design methods.

In the drawings and specification, there have been disclosed typical preferred embodiments of the invention, and although specific terms are employed, they are used in a descriptive sense only and not for the purposes of limitation. The invention has been described in considerable detail with specific reference to various preferred embodiments. It will be apparent, however, that various modifications and changes can be made within the spirit and scope of the invention as described in the foregoing specification and defined in the appended claims.

That which is claimed is:

1. A diffractive optical element comprising:
   a transmissive computer generated hologram formed of hydrogenated amorphous silicon and having a diffractive surface, said computer generated hologram being adapted to receive light emitted from a light source having a wavelength less than 1.0 micrometer and to pass the received light through said diffractive surface.

2. A diffractive optical element as defined by claim 1, wherein said hologram is fabricated by deposition and lift-off.

3. A diffractive optical element comprising:
   a computer generated hologram having a multilevel diffractive surface including more than two levels, said computer generated hologram being adapted to receive light emitted from a light source and to pass the received light through said multilevel diffractive surface, said hologram having phase skipping and having phase level differences which are larger than 2π.

4. A diffractive optical element as defined by claim 1 wherein said diffractive surface includes more than two levels.

5. A diffractive optical element as defined by claim 3 wherein said computer generated hologram is formed of hydrogenated amorphous silicon.

\* \* \* \* \*

UNITED STATES PATENT AND TRADEMARK OFFICE
CERTIFICATE OF CORRECTION

PATENT NO. : 5,606,434
DATED : February 25, 1997
INVENTOR(S) : Feldman et al.

It is certified that error appears in the above-identified patent and that said Letters Patent is hereby corrected as shown below:

On title page, item

[56] add to U.S. Patent Documents --5,132,811, 7/1992, Iwaki et al., 359/7--.

Signed and Sealed this

Ninth Day of September, 1997

Attest:

BRUCE LEHMAN

*Attesting Officer*     *Commissioner of Patents and Trademarks*